(12) United States Patent
Yang et al.

(10) Patent No.: US 7,588,153 B2
(45) Date of Patent: Sep. 15, 2009

(54) UTENSIL ORGANIZER

(75) Inventors: Frank Yang, Rancho Palos Verdes, CA (US); Myk Wayne Lum, Irvine, CA (US); Joe Sandor, Santa Ana Heights, CA (US)

(73) Assignee: Simplehuman LLC, Torrance, CA (US)

( * ) Notice: Subject to any disclaimer, the term of this patent is extended or adjusted under 35 U.S.C. 154(b) by 614 days.

(21) Appl. No.: 11/201,805

(22) Filed: Aug. 10, 2005

(65) Prior Publication Data

US 2007/0034582 A1    Feb. 15, 2007

(51) Int. Cl.
    A47F 7/00    (2006.01)
(52) U.S. Cl. ..................................... 211/70.7
(58) Field of Classification Search .............. 211/86.01, 211/87.01, 70.6, 88.01, 70.7; 206/561; 220/489, 220/486, 485, 8, 4.28, 551, 529, 528, 23.87, 220/23.86, 480, 483; 312/245; 40/658, 617; 248/221.12, 311, 2
    See application file for complete search history.

(56) References Cited

U.S. PATENT DOCUMENTS

| 1,752,361 | A | * | 4/1930 | Aulwes | 220/527 |
| 1,987,822 | A | * | 1/1935 | Gregory | 312/198 |
| 2,585,476 | A | * | 2/1952 | Lerner et al. | 223/107 |
| 2,720,189 | A | * | 10/1955 | Newman | 312/352 |
| 3,604,775 | A | * | 9/1971 | Anderson et al. | 312/265.1 |
| 3,684,102 | A | * | 8/1972 | Colter | 211/88.01 |
| 3,716,184 | A | * | 2/1973 | Mott et al. | 232/43.1 |
| 3,924,734 | A | * | 12/1975 | Gardner et al. | 206/736 |
| 4,289,249 | A | * | 9/1981 | Cripe | 220/528 |
| 4,534,474 | A | * | 8/1985 | Ng | 211/70 |
| D329,766 | S | * | 9/1992 | Ancona et al. | D6/467 |
| 5,207,344 | A | * | 5/1993 | Davies et al. | 220/23.83 |
| 5,320,241 | A | * | 6/1994 | Evans | 220/495.09 |
| 5,361,915 | A | * | 11/1994 | Cohen et al. | 211/70.7 |
| 5,490,607 | A | * | 2/1996 | Hsieh et al. | 220/483 |
| 5,524,761 | A | * | 6/1996 | Wayman | 206/545 |
| D523,297 | S | * | 6/2006 | Yang et al. | D7/637 |
| D523,298 | S | * | 6/2006 | Yang et al. | D7/637 |
| 7,322,467 | B2 | * | 1/2008 | Youngblood | 206/233 |
| 2007/0051729 | A1 | * | 3/2007 | Osborne | 220/529 |

* cited by examiner

*Primary Examiner*—Janet M Wilkens
(74) *Attorney, Agent, or Firm*—Raymond Sun

(57) ABSTRACT

A utensil organizer has an outer shell that defines an internal space, a wall associated with the outer shell, and a spoon holder having a surface with a concavity formed in the surface, with the spoon holder removably coupled to the wall. The organizer can also include a divider that separates the internal space into a plurality of compartments, with each of the compartments having a floor. The floors of at least two different compartments have different vertical levels.

5 Claims, 5 Drawing Sheets

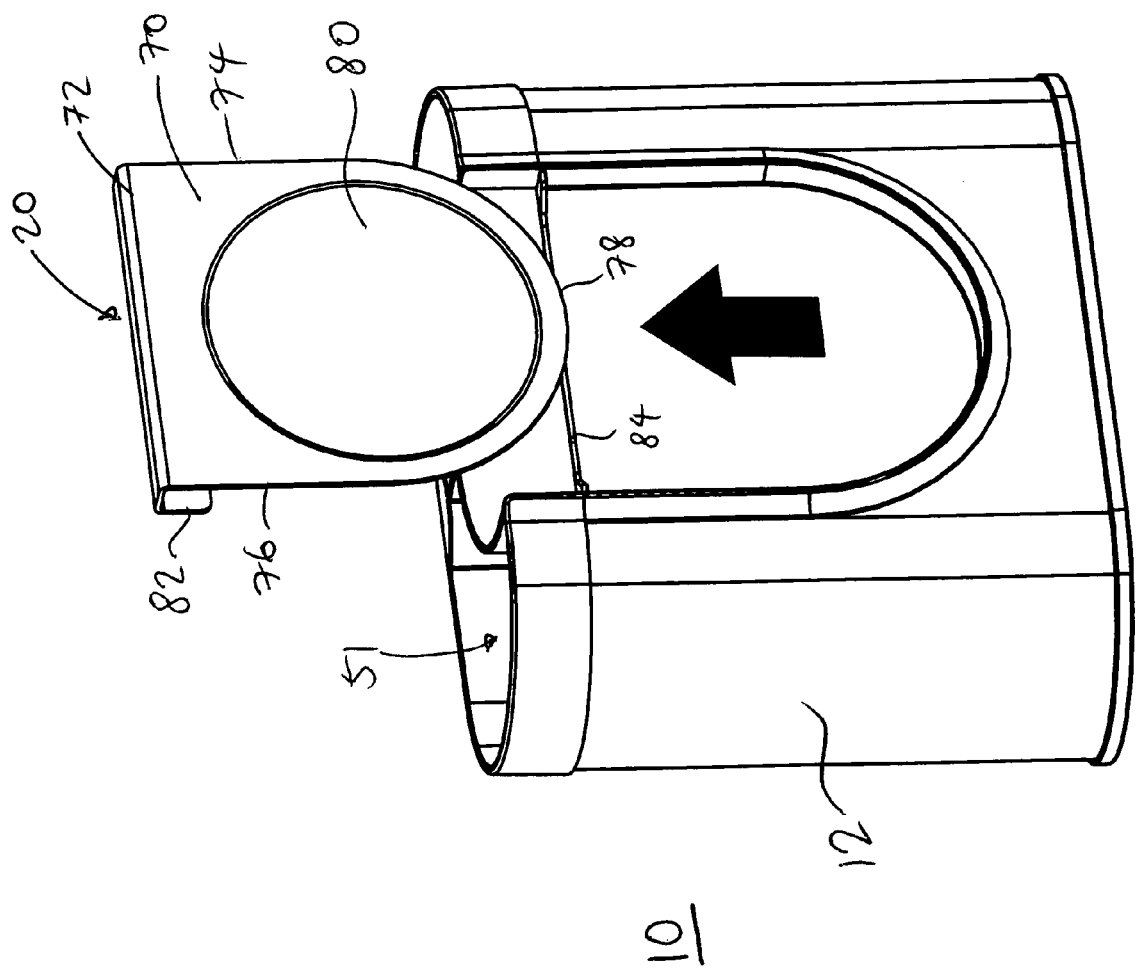

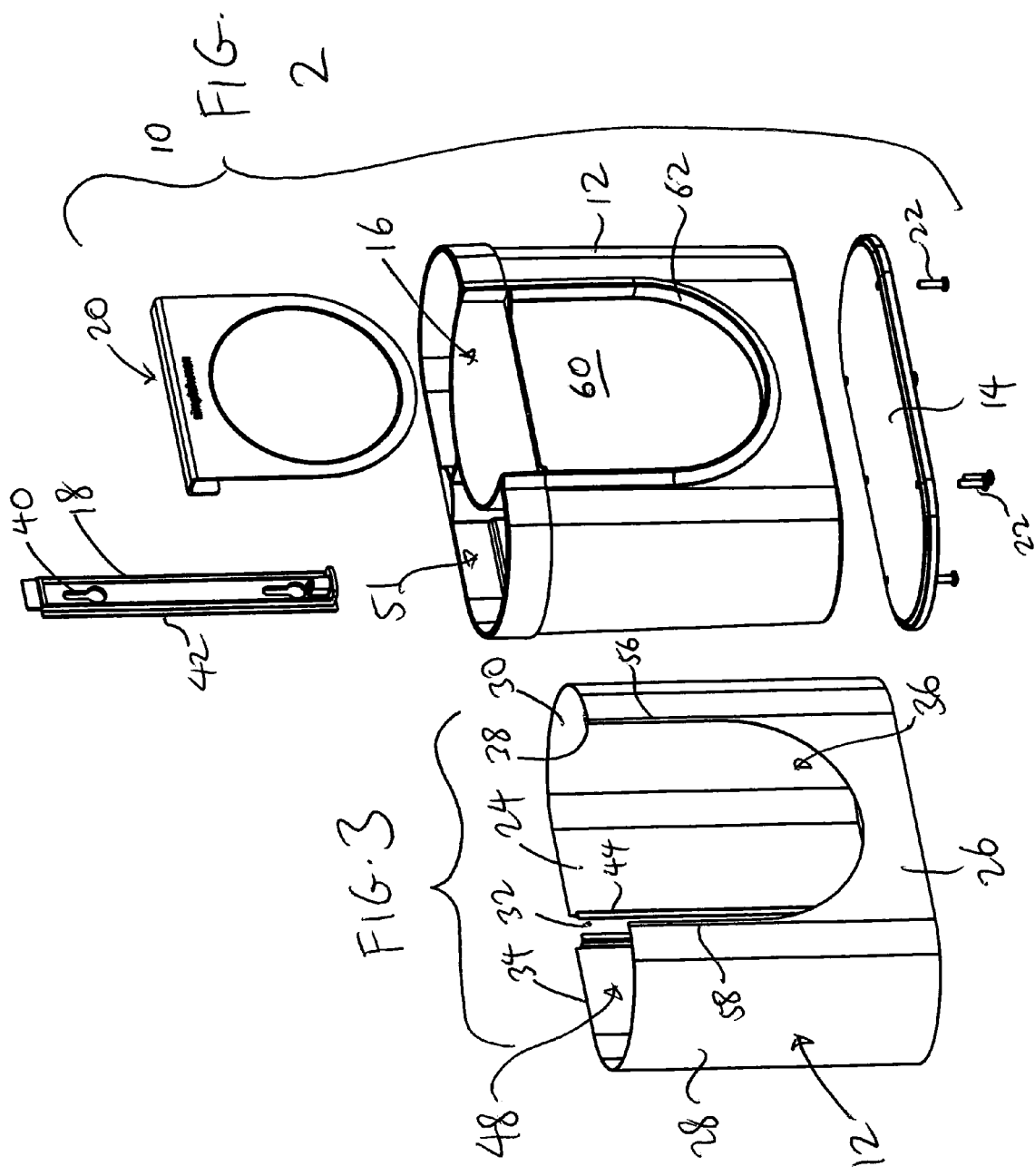

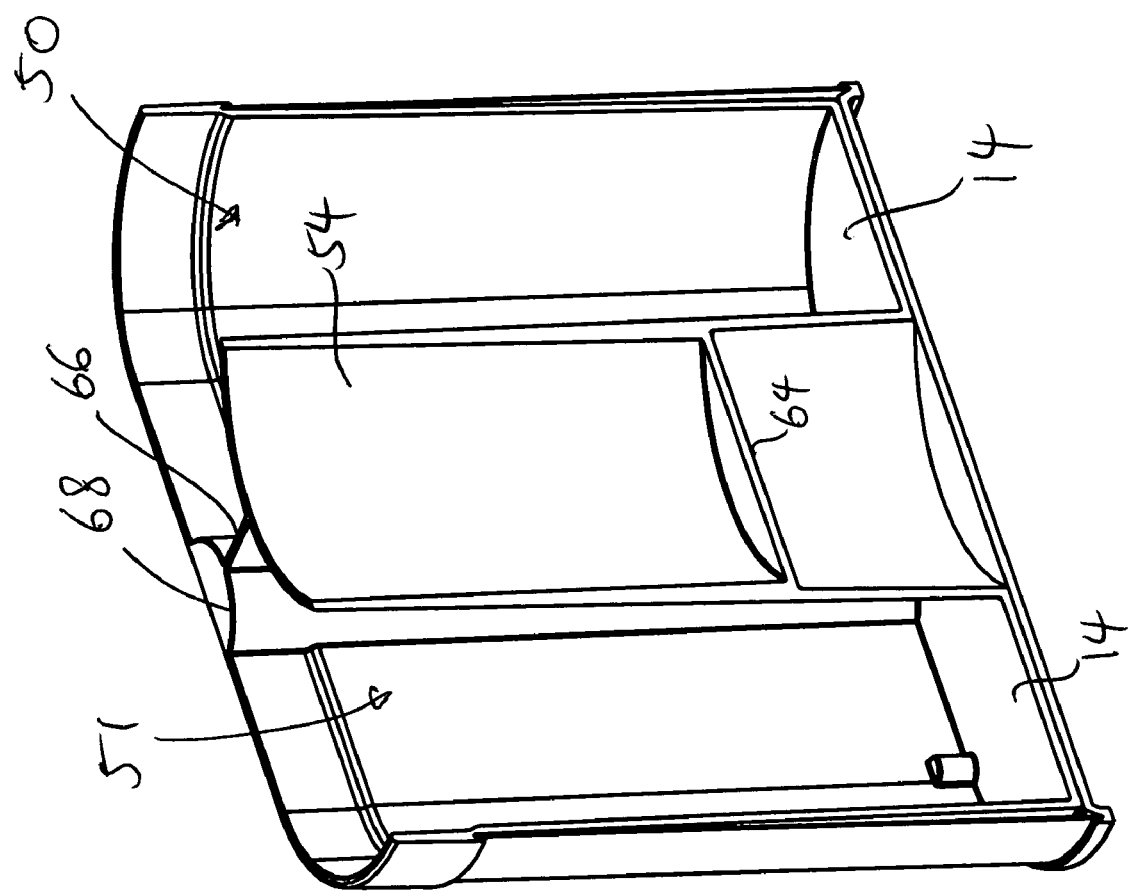

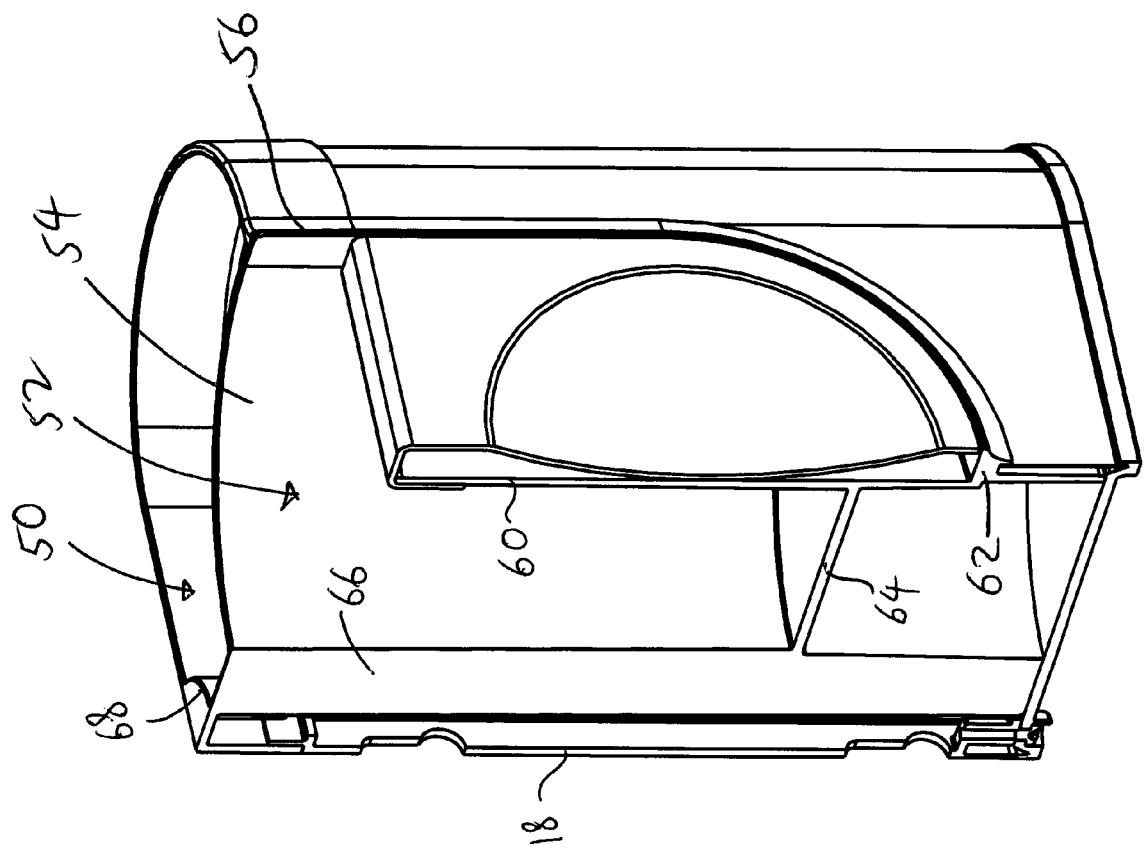

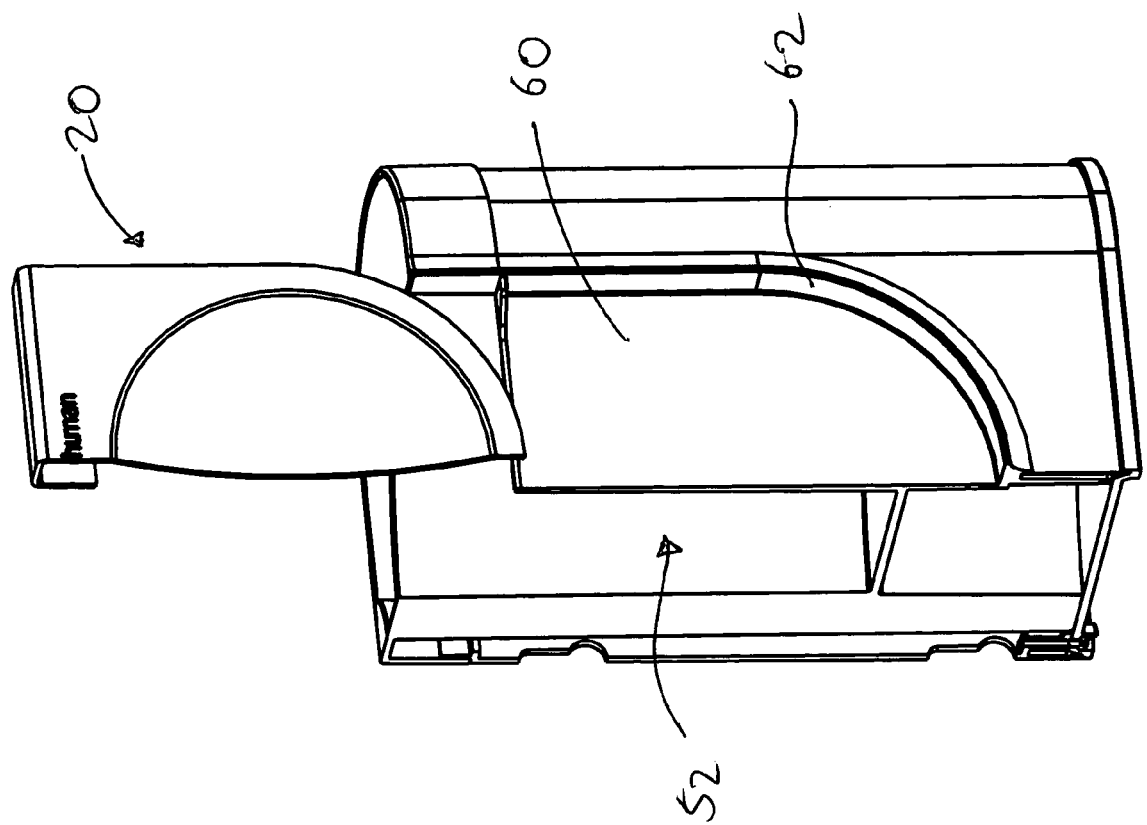

UTENSIL ORGANIZER

BACKGROUND OF THE INVENTION

1. Field of the Invention

The present invention relates to kitchen organizers, and in particular, to a utensil organizer that has a removable spoon holder.

2. Description of the Prior Art

Many kitchens are becoming increasingly cluttered with dishes, utensils and other cooking and food items. In particular, larger families living in smaller homes (having smaller kitchens) have an increased need to better organize the kitchen area to minimize hazardous situations and to increase efficient use of the kitchen area.

The storage of utensils has always posed challenges to the organized kitchen. Most utensils, such as ladles, spoons, forks, knives and similar items, are often stored inside the drawers that are adjacent a stove-top or counter-top. Storage in drawers can be very inconvenient to a user because the user needs to open the appropriate drawers to access the desired utensil, and it is dangerous to keep one or more drawers opened during a cooking session. Some people store utensils inside mugs or similar tall drinking vessels on a counter-top, but this can be dangerous since the drinking vessel can be tipped. Others lay towels or disposable paper-towels on a counter-top as mats so that ladles and spoons can be placed on top of these towels or disposable paper-towels during a cooking session, but these towels and disposable paper-towels are not always effective as mats because the ladles and spoons can sometimes be very hot.

SUMMARY OF THE DISCLOSURE

It is an object of the present invention to provide an apparatus that allows utensils to be organized and used more effectively, conveniently and safely on a counter-top.

In order to accomplish the objects of the present invention, the present invention provides a utensil organizer having an outer shell that defines an internal space, a wall associated with the outer shell, and a spoon holder having a surface with a concavity formed in the surface, with the spoon holder removably coupled to the wall.

In one embodiment of the present invention, the organizer also includes a divider that separates the internal space into a plurality of compartments, with each of the compartments having a floor. The floors of at least two different compartments have different vertical levels.

BRIEF DESCRIPTION OF THE DRAWINGS

FIG. 1 is a perspective view of a utensil organizer according to one embodiment of the present invention.

FIG. 2 is an exploded perspective view of the organizer of FIG. 1.

FIG. 3 is a perspective view of the outer shell of the organizer of FIG. 1.

FIG. 4 is a longitudinal cross-sectional view of the organizer of FIG. 1.

FIG. 5 is a transverse cross-sectional view of the organizer of FIG. 1.

FIG. 6 is a transverse cross-sectional view of the organizer of FIG. 1 showing the spoon holder raised from the support holder.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIGS. 1-6 illustrate a utensil organizer 10 according to one embodiment of the present invention. The organizer 10 includes an outer shell 12, a base plate 14, an inner divider 16, an optional hanger plate 18, and a removable spoon holder 20. The base plate 14 can be secured to the bottom of the outer shell 12 by screws 22. The outer shell 12 has an internal space 48 that is defined by a rear wall 24 and a front wall 26 connected by curved end walls 28, 30. An elongated slot 32 is provided at about the center of the rear wall 24 extending from the top edge 34 of the rear wall 24, and a U-shaped opening 36 is provided at about the center of the front wall 26 extending from the top edge 38 of the front wall 26.

The optional hanger plate 18 has two elongated hanging openings 40 provided thereon, and is adapted to receive a nail or hanger that is secured to a wall so that the hanger plate 18 (and the organizer 10) can be suspended from a wall in the kitchen. The hanger plate 18 also has a set of rails 42 provided along each lateral side so that each of the two side edges 44 of the elongated slot 32 can be received inside a corresponding set of rails 42 when the hanger plate 18 is slid into the slot 32.

The inner divider 16 functions to divide the internal space 48 into three separate utensil compartments 50, 51, 52. As best shown in FIGS. 2, 4 and 5, the divider 16 has a generally semi-circular wall 54 that extends from one edge 56 of the opening 36 into the internal space 48 and to the other edge 58 of the opening 36. The divider 16 also includes a recessed front wall 60 that is offset interiorly (towards the compartment 52) from the edges 56, 58 by a U-shaped ledge 62. A shelf 64 is positioned in the compartment 52 and extends from the recessed front wall 60 to the semi-circular wall 54. A transverse wall 66 extends from the center of the semi-circular wall 54 to a curved wall 68 adjacent the rear wall 24 of the outer shell 12. The curved wall 68 is positioned adjacent the slot 32 to receive the hanger plate 18. Thus, the transverse wall 66 and the semi-circular wall 54 divide the internal space 48 into the three separate compartments 50, 51, 52. The compartments 50, 51 are defined by the outer shell 12, the transverse wall 66 and the semi-circular wall 54, with the transverse wall 66 separating the compartment 50 from the compartment 51. The compartment 52 is defined by the semi-circular wall 54 and the recessed front wall 60. The respective walls 54, 60, 66, 68, ledge 62 and shelf 64 of the divider 16 are secured to the outer shell 12 so that the divider 16 and the outer shell 12 form a unitary structure.

Thus, as best shown in FIG. 4, the shelf 64 and the base plate 14 define two different vertical levels for storing utensils. Specifically, the shelf 64 in the compartment 52 is at a higher vertical level than the base plate 14 in the compartments 50 and 51. Providing compartments having different depths allows for different utensils to be stored in different compartments, thereby providing more efficient organization. For example, longer utensils (e.g., knives) can be stored in the compartments 50 and 51, while shorter utensils (e.g., children's spoons and forks) can be stored in the compartment 52.

The spoon holder 20 has a plate 70 with a straight top edge 72, two generally straight side edges 74, 76 extending from the top edge 72, and a curved bottom edge 78 that connect the side edges 74, 76. A concavity 80 is formed in the center of the plate 70 for receiving a large spoon or ladle. A shoulder 82 extends from the top edge 72, and is adapted to be seated on the top edge 84 of the recessed front wall 60, as best shown in FIG. 5. Thus, the spoon holder 20 can be conveniently and removably retained in the space defined by the ledge 62 and the opening 36 by suspending the shoulder 82 on the top edge 84 of the recessed front wall 60. When the spoon holder 20 is suspended on the top edge 84, the spoon holder 20 completely covers the recessed front wall 60, and the outer surface of the plate 70 of the spoon holder 20 is generally aligned (i.e., flush) with the outer surface of the front wall 26 of the outer shell 12 (see FIG. 5) so that the spoon holder 20 appears to be a part of the utensil organizer 10. This enhances the aesthetic appeal of the organizer 10. The spoon holder 20 can be removed from the organizer 10 and placed on a counter-top, with the shoulder 82 acting to tilt the plate 70 at a small angle. The user can then place a large spoon or ladle on the concavity 80.

In addition to suspending the spoon holder 20 from a recessed front wall 60, there are other ways of removably coupling the spoon holder 20 to the utensil organizer 10. As one non-limiting example, a groove (not shown) can be provided in the U-shaped ledge 62, and the side edges 74, 76 of the spoon holder 20 can be slid up and down along the groove. As another non-limiting example, the U-shaped ledge 62 can be omitted and the recessed front wall 60 made flush with the walls 26, 28 and 30 so that the recessed front wall 60 is now part of the front wall 26, with the spoon holder 20 removably coupled to the front wall 26 by a hook, magnetic connection, or suspension from the top edge of the front wall 26, among others. As yet another non-limiting example, the spoon holder 20 can be removably coupled to the end walls 28, 30 or the rear wall 24 by a hook, magnetic connection, or suspension from the top edge of any of these walls 24, 28 or 30, among others.

The outer shell 12 and the spoon holder 20 can be made of stainless steel or other metal. It is also possible to provide the outer shell 12 in the form of a wire frame structure. Alternatively, the outer shell 12 and the spoon holder 20 can also be made of a plastic material.

Thus, the organizer 10 provides three separate compartments 50, 51 and 52 for holding utensils, so that the user can organize different utensils into different compartments 50, 51, 52. These compartments 50, 51, 52 can have a base or floor 14 or 64 that have different vertical levels. The organizer 10 also provides a removable spoon holder 20 that normally blends in with the aesthetic appearance of the organizer 10, yet can be removed and placed on a counter-top for holding a large spoon or ladle.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A utensil organizer, comprising:
   an outer shell that defines an internal space, the outer shell having an outer surface;
   a wall associated with the outer shell, the wall having a top edge;
   a spoon holder having a surface with a concavity formed in the surface, the spoon holder having a shoulder that is suspended on the top edge of the wall;
   wherein the wall is recessed from the outer shell, with the spoon holder covering the wall when the spoon holder is suspended from the top edge of the wall; and
   the surface of the spoon holder is aligned to be flush with the outer surface of the outer shell.

2. The organizer of claim 1, further including a divider that separates the internal space into a plurality of compartments.

3. The organizer of claim 2, wherein each compartment has a floor, with the floors of at least two different compartments having different vertical levels.

4. The organizer of claim 1, further including a hanger plate provided on the outer shell, the hanger plate having at least one elongated hanging opening.

5. A utensil organizer, comprising:
   an outer shell that defines an internal space;
   a wall associated with the outer shell, the wall having a top edge;
   a spoon holder having a surface with a concavity formed in the surface, the spoon holder having a shoulder that is suspended on the top edge of the wall; and
   wherein the outer shell defines an opening, with the wall positioned offset from the opening, and with the spoon holder positioned in the opening when the spoon holder is suspended from the top edge of the wall.

\* \* \* \* \*